United States Patent
Krehel et al.

(10) Patent No.: US 12,089,583 B2
(45) Date of Patent: Sep. 17, 2024

(54) METHOD AND APPARATUS FOR CONTROLLING PEST ANIMALS

(71) Applicant: CATCH DATA LTD., Kelowna (CA)

(72) Inventors: Mark Krehel, Kelowna (CA); Ken Gauthier, Kelowna (CA); Joe Abercrombie, Vancouver (CA)

(73) Assignee: CATCH DATA IP HOLDINGS LTD. (CA)

( * ) Notice: Subject to any disclaimer, the term of this patent is extended or adjusted under 35 U.S.C. 154(b) by 0 days.

(21) Appl. No.: 18/032,537

(22) PCT Filed: Nov. 19, 2021

(86) PCT No.: PCT/CA2021/051648
§ 371 (c)(1),
(2) Date: Apr. 18, 2023

(87) PCT Pub. No.: WO2022/104476
PCT Pub. Date: May 27, 2022

(65) Prior Publication Data
US 2023/0309546 A1      Oct. 5, 2023

Related U.S. Application Data

(60) Provisional application No. 63/116,753, filed on Nov. 20, 2020.

(51) Int. Cl.
*A01M 23/14* (2006.01)
*A01M 23/30* (2006.01)
(Continued)

(52) U.S. Cl.
CPC ............ *A01M 23/14* (2013.01); *A01M 23/30* (2013.01); *A01M 27/00* (2013.01); *A01M 23/245* (2013.01); *A01M 23/38* (2013.01); *A01M 31/002* (2013.01)

(58) Field of Classification Search
CPC .... A01M 23/00; A01M 23/24; A01M 23/245; A01M 23/30; A01M 23/36; A01M 27/00; A01M 23/14
(Continued)

(56) References Cited

U.S. PATENT DOCUMENTS 103,767 A * 5/1870 Owen ................... A01M 23/30
                                                              43/81
332,175 A * 12/1885 Wolfe ................... A01M 23/36
                                                              43/79
(Continued)

FOREIGN PATENT DOCUMENTS

CN       101524062 A  *  9/2009   ............ A01M 23/18
CN       105028381 A  *  11/2015
(Continued)

OTHER PUBLICATIONS

Search Report from corresponding WIPO application No. PCT/CA2021/051648.

*Primary Examiner* — Darren W Ark

(57) ABSTRACT

An apparatus for controlling animal pests comprises a housing having a passage extending into the housing from an entrance, an impacting member movable across the passage and a planar sensor spaced apart from the kill bar by a predetermined distance along the passage towards the entrance, the planar sensor configured to sense the presence of the animal pest across a sensing plane across the passage wherein the impacting member is operable to be released to rapidly move across the passage when the planar sensor indicates the presence of the animal pest as passed through the sensing plane.

15 Claims, 12 Drawing Sheets

(51) Int. Cl.
*A01M 27/00* (2006.01)
*A01M 23/24* (2006.01)
*A01M 23/38* (2006.01)
*A01M 31/00* (2006.01)

(58) Field of Classification Search
USPC .................................................. 43/58, 77–81
See application file for complete search history.

(56) References Cited

U.S. PATENT DOCUMENTS

| | | | | |
|---|---|---|---|---|
| 718,853 | A * | 1/1903 | Merritt | A01M 23/30 43/81 |
| 824,246 | A * | 6/1906 | Jones | A01M 23/24 43/85 |
| 1,464,697 | A * | 8/1923 | Connolly | A01M 23/12 43/75 |
| 1,858,096 | A * | 5/1932 | Lementy | A01M 23/00 43/58 |
| 2,047,417 | A * | 7/1936 | Kalina | A01M 23/00 43/78 |
| 2,061,123 | A * | 11/1936 | Ward | A01M 23/36 43/79 |
| 2,531,568 | A * | 11/1950 | Helme | A01M 23/38 43/79 |
| 2,638,700 | A * | 5/1953 | Nantt | A01M 23/36 43/80 |
| 2,669,056 | A * | 2/1954 | Lehman | A01M 23/20 43/79 |
| 2,748,526 | A * | 6/1956 | Roman | A01M 23/18 43/60 |
| 2,754,619 | A * | 7/1956 | Senner | A01M 23/30 43/86 |
| 3,217,445 | A * | 11/1965 | Wade | A01M 27/00 43/131 |
| 3,362,100 | A * | 1/1968 | Winkler | A01M 23/30 43/78 |
| 3,530,613 | A * | 9/1970 | Brubakken | A01M 23/24 43/85 |
| 3,815,278 | A * | 6/1974 | Beaton | A01M 23/38 43/99 |
| 4,349,980 | A * | 9/1982 | McKee | A01M 23/30 43/75 |
| 4,425,732 | A * | 1/1984 | Kania | A01M 23/30 43/81 |
| 4,450,648 | A * | 5/1984 | Pratscher | A01M 23/14 43/79 |
| 4,483,094 | A * | 11/1984 | McKee | A01M 23/30 43/75 |
| 4,541,199 | A * | 9/1985 | Reidinger, Jr. | A01M 25/00 43/131 |
| 4,550,524 | A * | 11/1985 | Goebel | A01M 23/14 43/78 |
| 4,612,724 | A * | 9/1986 | Alboainin | A01M 27/00 43/79 |
| 4,641,456 | A * | 2/1987 | Boharski | A01M 23/12 43/73 |
| 4,653,221 | A * | 3/1987 | Pratscher | A01M 27/00 43/79 |
| 4,669,216 | A * | 6/1987 | Moss | A01M 27/00 43/99 |
| 4,854,073 | A * | 8/1989 | Ball | A01M 23/36 43/75 |
| 5,224,287 | A * | 7/1993 | Knudsen | A01M 23/30 43/75 |
| 5,815,982 | A * | 10/1998 | Garretson | A01M 1/12 43/73 |
| 5,918,409 | A * | 7/1999 | Carnwath | A01M 23/12 43/99 |
| 6,088,948 | A * | 7/2000 | Rønnau | A01M 23/12 43/72 |
| 6,445,301 | B1 * | 9/2002 | Farrell | A01M 31/002 340/567 |
| 6,718,688 | B2 * | 4/2004 | Garretson | A01M 1/12 43/73 |
| 6,807,767 | B1 * | 10/2004 | Schade | A01M 23/30 43/77 |
| 7,076,913 | B1 * | 7/2006 | Dow | A01M 31/002 43/79 |
| 7,854,089 | B2 * | 12/2010 | Deibert | A01M 23/38 43/99 |
| 9,439,412 | B2 * | 9/2016 | Kittelson | A01M 23/18 |
| 9,468,204 | B2 * | 10/2016 | Bond | A01M 23/14 |
| 9,615,566 | B2 * | 4/2017 | Bond | A01M 27/00 |
| 10,143,192 | B2 * | 12/2018 | Brown | G01L 19/12 |
| 10,143,193 | B2 * | 12/2018 | Noe | G01J 5/0025 |
| 10,357,027 | B2 * | 7/2019 | Othon | A01M 23/20 |
| 10,440,944 | B2 * | 10/2019 | LaRoque | A01M 31/002 |
| 11,457,622 | B2 * | 10/2022 | Siebert | A01M 23/245 |
| 11,464,222 | B2 * | 10/2022 | Chen | A01M 23/38 |
| 2003/0213161 | A1 * | 11/2003 | Gardner, Jr. | A01M 23/00 43/114 |
| 2006/0123693 | A1 * | 6/2006 | Muller | A01M 31/002 43/99 |
| 2007/0245617 | A1 * | 10/2007 | Deibert | A01M 23/10 43/72 |
| 2008/0120895 | A1 * | 5/2008 | Schwartz | A01M 31/002 43/99 |
| 2009/0153797 | A1 * | 6/2009 | Allon | A61B 3/12 362/11 |
| 2009/0172995 | A1 * | 7/2009 | Wetzel | A01M 23/38 43/98 |
| 2009/0205244 | A1 * | 8/2009 | Pomerantz | A01M 23/18 43/61 |
| 2009/0223112 | A1 * | 9/2009 | Deibert | A01M 19/00 43/99 |
| 2010/0283610 | A1 * | 11/2010 | Wetzel | A01M 31/002 340/556 |
| 2011/0023350 | A1 * | 2/2011 | Hovey | A01M 23/08 43/81 |
| 2011/0289820 | A1 * | 12/2011 | Waddington | A01M 23/24 43/81 |
| 2011/0296739 | A1 * | 12/2011 | Bond | A01M 23/36 43/83.5 |
| 2014/0059917 | A1 * | 3/2014 | Bond | A01M 27/00 43/78 |
| 2014/0283435 | A1 * | 9/2014 | Galeb | A01M 1/106 43/107 |
| 2014/0345188 | A1 * | 11/2014 | Connolly | A01M 23/02 43/58 |
| 2015/0033614 | A1 * | 2/2015 | Allbright, Jr. | A01M 23/18 43/60 |
| 2015/0150236 | A1 * | 6/2015 | Grant | A01M 23/38 43/99 |
| 2016/0245916 | A1 * | 8/2016 | Weber-Grabau | H01J 37/32917 |
| 2016/0302402 | A1 * | 10/2016 | Fritzbøger | A01M 23/16 |
| 2017/0354139 | A1 * | 12/2017 | Vickery | A01M 23/16 |
| 2018/0055037 | A1 * | 3/2018 | Sorensen | A01M 27/00 |
| 2018/0271085 | A1 * | 9/2018 | Sørensen | A01M 23/38 |
| 2018/0317475 | A1 * | 11/2018 | Redmayne | A01M 31/008 |
| 2019/0110458 | A1 * | 4/2019 | Liu | A01M 1/026 |
| 2019/0183107 | A1 * | 6/2019 | Edevold | A01M 23/08 |
| 2019/0187281 | A1 * | 6/2019 | Weber-Grabau | G01B 11/08 |
| 2019/0302265 | A1 * | 10/2019 | Jansson | G01S 17/46 |
| 2020/0187485 | A1 * | 6/2020 | Damgaard Jensen | A01M 23/30 |
| 2020/0187486 | A1 * | 6/2020 | Chen | A01M 23/38 |
| 2020/0305406 | A1 * | 10/2020 | Ritchie | A01M 1/145 |
| 2021/0244012 | A1 * | 8/2021 | Frazier | A01M 23/24 |
| 2021/0333699 | A1 * | 10/2021 | Peel | G06F 3/0421 |
| 2022/0039369 | A1 * | 2/2022 | Shiels | A01M 23/16 |
| 2022/0039370 | A1 * | 2/2022 | Holm | A01M 23/24 |
| 2022/0142145 | A1 * | 5/2022 | Bond | F16K 31/122 |
| 2022/0330539 | A1 * | 10/2022 | Hansen | A01M 27/00 |
| 2023/0029020 | A1 * | 1/2023 | Howard | A01M 23/12 |
| 2023/0066354 | A1 * | 3/2023 | Kisling-Møller | A01M 23/245 |
| 2023/0066844 | A1 * | 3/2023 | Chen | A01M 23/38 |
| 2023/0130763 | A1 * | 4/2023 | Schlichter | A01M 23/245 43/81 |

(56) References Cited

U.S. PATENT DOCUMENTS

| | | | | |
|---|---|---|---|---|
| 2023/0200370 A1* | 6/2023 | Porter | .................. | A01M 23/24 43/75 |
| 2023/0232815 A1* | 7/2023 | Sorensen | ............... | A01M 23/36 43/79 |
| 2023/0324307 A1* | 10/2023 | Deshpande | .......... | G01N 21/255 348/135 |

FOREIGN PATENT DOCUMENTS

| | | | | | |
|---|---|---|---|---|---|
| CN | 106332862 | A | * | 1/2017 | |
| CN | 107211991 | A | * | 9/2017 | ............ A01M 23/02 |
| CN | 108669061 | A | * | 10/2018 | ............ A01M 23/00 |
| CN | 208724763 | U | | 4/2019 | |
| CN | 111820204 | A | * | 10/2020 | |
| DE | 826375 | C | * | 1/1952 | |
| DE | 202017106850 | U1 | * | 2/2018 | ............ A01M 23/16 |
| EP | 1400172 | A1 | * | 3/2004 | ............ A01M 23/24 |
| EP | 1894469 | A1 | * | 3/2008 | ............ A01M 23/24 |
| EP | 2211609 | B1 | * | 3/2016 | ............ A01M 23/12 |
| EP | 3289871 | A1 | * | 3/2018 | ............ A01M 23/16 |
| EP | 3378309 | A1 | * | 9/2018 | |
| GB | 2161690 | A | * | 1/1986 | ............ A01M 27/00 |
| GB | 2503863 | A | * | 1/2014 | ............ A01M 23/12 |
| GB | 2565808 | A | * | 2/2019 | ............ A01M 23/24 |
| GB | 2587451 | A | * | 3/2021 | ............ A01M 23/30 |
| GB | 2598149 | A | * | 2/2022 | ............ A01M 23/24 |
| RU | 2322806 | C2 | | 4/2008 | |
| WO | WO-8200568 | A1 | * | 3/1982 | |
| WO | WO-9011685 | A1 | * | 10/1990 | |
| WO | WO-2008104448 | A1 | * | 9/2008 | ............ A01M 27/00 |
| WO | WO-2009097898 | A1 | * | 8/2009 | ............ A01M 23/36 |
| WO | WO-2009125169 | A1 | * | 10/2009 | ............ A01M 23/30 |
| WO | WO-2013064146 | A1 | * | 5/2013 | ............ A01M 23/14 |
| WO | WO-2015081963 | A1 | * | 6/2015 | ............ A01M 23/16 |
| WO | WO-2016062991 | A1 | * | 4/2016 | ............ A01M 23/36 |
| WO | WO-2017078546 | A1 | * | 5/2017 | ............ A01M 23/24 |
| WO | WO-2017188828 | A1 | * | 11/2017 | |
| WO | WO-2019048347 | A1 | * | 3/2019 | ............ A01M 23/30 |
| WO | 20200038539 | A2 | | 2/2020 | |
| WO | WO-2020038539 | A2 | * | 2/2020 | ............ A01M 27/00 |
| WO | WO-2020216428 | A1 | * | 10/2020 | ............ A01M 23/12 |
| WO | WO-2021133178 | A1 | * | 7/2021 | ............ A01M 23/12 |
| WO | WO-2021160819 | A1 | * | 8/2021 | ............ A01M 23/16 |

* cited by examiner

METHOD AND APPARATUS FOR CONTROLLING PEST ANIMALS

CROSS-REFERENCE TO RELATED APPLICATIONS

This application is a U.S. National Stage of International Application No. PCT/CA2021/051648, filed Nov. 19, 2021, which claims the benefit of U.S. Provisional Application No. 63/116,753, filed Nov. 20, 2020, each of which is hereby incorporated by reference in its entirety

BACKGROUND

1. Technical Field

This disclosure relates generally to controlling pest animal populations and in particular to a method and apparatus for terminating and containing rodents without the use of poisonous substances.

2. Description of Related Art

Rodents such as rats and mice along with other animals are a frequent pest animals in many locations. Conventional attempts to control pests has been commonly divided into either trapping or poisoning them. Such conventional approaches have not been satisfactory. In particular, it has been found that use of poisons risks poisoning or killing other species which may also consume the poisoned bait or the bodies of the dead animals after they are killed by the poison.

Furthermore, conventional traps have also been unsatisfactory. In particular, a common styles of rodent traps utilize a spring loaded arm released by a catch which is intended to catch and usually kill the animal. One disadvantage of such traps is that they may only be used a single time before being required to be checked and reset by a user.

Applicant is aware of attempts to correct the aforementioned defects by providing an automatic rodent trap utilizing a trigger rod positioned in a chamber into which a rodent is drawn by a bait. The trigger rod, when rotated by the rodent releases a valve thereby releasing a spring loaded kill mechanism operable to impact and kill the rodent in the chamber. An example of such device may be found in US Patent Application Publication No. 2017/0202206 to Bond et al. Disadvantageously, such devices rely upon movement of the trigger rod which may be prone to false results due to movement of the device or the presence of other objects. Furthermore, such devices permit the body of the rodent to fall on the ground below the device such that it is intended that predators will remove and eat them. However, such removal of the bodies prevents their collection for the purpose of studying the efficacy of such a device.

SUMMARY OF THE DISCLOSURE

According to a first embodiment, there is disclosed an apparatus for controlling animal pests comprising a housing having a passage extending into the housing from an entrance, an impacting member movable across the passage and a planar sensor spaced apart from the kill bar by a predetermined distance along the passage towards the entrance, the planar sensor configured to sense the presence of the animal pest across a sensing plane across the passage wherein the impacting member is operable to be released to rapidly move across the passage when the planar sensor indicates the presence of the animal pest as passed through the sensing plane.

The planar sensor may be selected from the group consisting of infrared, ultrasonic and laser. The planar sensor may be limited to the sensing plane. The planar sensor may include a lense thereover which substantially blocks sensing thereby except for through a slot defining the sensing plane. The planar sensor may comprise a transmitter and a receiver. The apparatus may further comprise a controller operable to cause the impacting member to move across the passage, impacting the animal pest upon receipt of a signal from the planar sensor.

The passage may be formed with a floor and at least one wall extending around the passage. The floor may be rotatable from a horizontal to a dropped vertical position. The floor may be caused to rotate to the dropped vertical position after the impacting member impacts the animal pest. The floor may be released by a catch to drop to the vertical position. The apparatus may further comprise a reset lift adapted to reset the floor to the horizontal position. The apparatus may further comprise a collection bin located below the floor wherein animal pest carcasses are deposited thereinto by the floor.

The apparatus may further comprise two planar sensors spaced to opposite sides of the impacting member along the passage. The impacting member may be configured to impact the animal pest when both planar sensors indicate the presence of the animal pest at the sensing plane thereof. The two planar sensors may be spaced equal distance away from the impacting member. The two planar sensors may be spaced away from impacting member by a distance corresponding to a distance from the nose to the neck of the target animal pest.

The impacting member may comprise a bar extending substantially vertically. The impacting member may be movable between first and second positions on opposite sides of the passage. The apparatus may further comprise a drive mechanism for moving the impacting member between first and second positions along an animal striking path.

The drive mechanism may comprise a spring. The apparatus may further comprise a reset motor adapted to move the impacting member to the first position.

The animal striking path may be linear. The animal striking path may be arcuate. The animal striking path may be substantially horizontal. The animal striking path may be substantially vertical.

The apparatus may further comprise an immovable surface opposite to the first position wherein the second position is towards the immovable surface. The path may include substantially transparent walls. The apparatus may further comprise a bait dispenser operable to discharge a bait into the passage.

According to a first embodiment, there is disclosed an apparatus for controlling method for controlling animal pests comprising providing a housing having a passage extending thereinto from an entrance, sensing with a first planar sensor the presence of the animal pest at a sensing plane extending across the passage and causing an impacting member to rapidly move across the passage in response to the first planar sensor detecting the presence of the animal pest at the sensing plane, wherein the impacting member is located at a distance from the sensing plane towards the entrance selected to correspond to the distance between the nose and the neck of the animal pest.

The method may further comprise providing a second planar sensor spaced apart from the impacting member by the same distance as the first planar sensor. The method may further comprise providing a second entrance to each end of the passage.

According to a further embodiment, there is disclosed an apparatus for controlling apparatus for controlling animal pests comprising a housing having a passage thereinto, the passage having a floor member and an animal killing mechanism located within said path, the path having a rotatable floor operable to rotate downward after the killing mechanism kills the animal pest The apparatus may further comprise a collection bin located below the floor. The housing may be spaced above a ground surface to deposit killed animal pests therebelow.

The animal killing mechanism may be located within the floor. The animal killing mechanism may comprise electrically charged plates operable to deliver a fatal charge to an animal thereon.

The animal killing mechanism may comprise an impactor adapted to deliver a killing blow to the animal pest within the passage. The apparatus may further comprise a sensor adapted to detect the presence of a target animal pest at a desired location within the passage to trigger the animal killing mechanism.

Other aspects and features of the present disclosure will become apparent to those ordinarily skilled in the art upon review of the following description of specific embodiments in conjunction with the accompanying figures.

BRIEF DESCRIPTION OF THE DRAWINGS

The accompanying drawings constitute part of the disclosure. Each drawing illustrates exemplary aspects wherein similar characters of reference denote corresponding parts in each view.

DETAILED DESCRIPTION

Aspects of the present disclosure are now described with reference to exemplary apparatuses, methods and systems.

Figure 1:
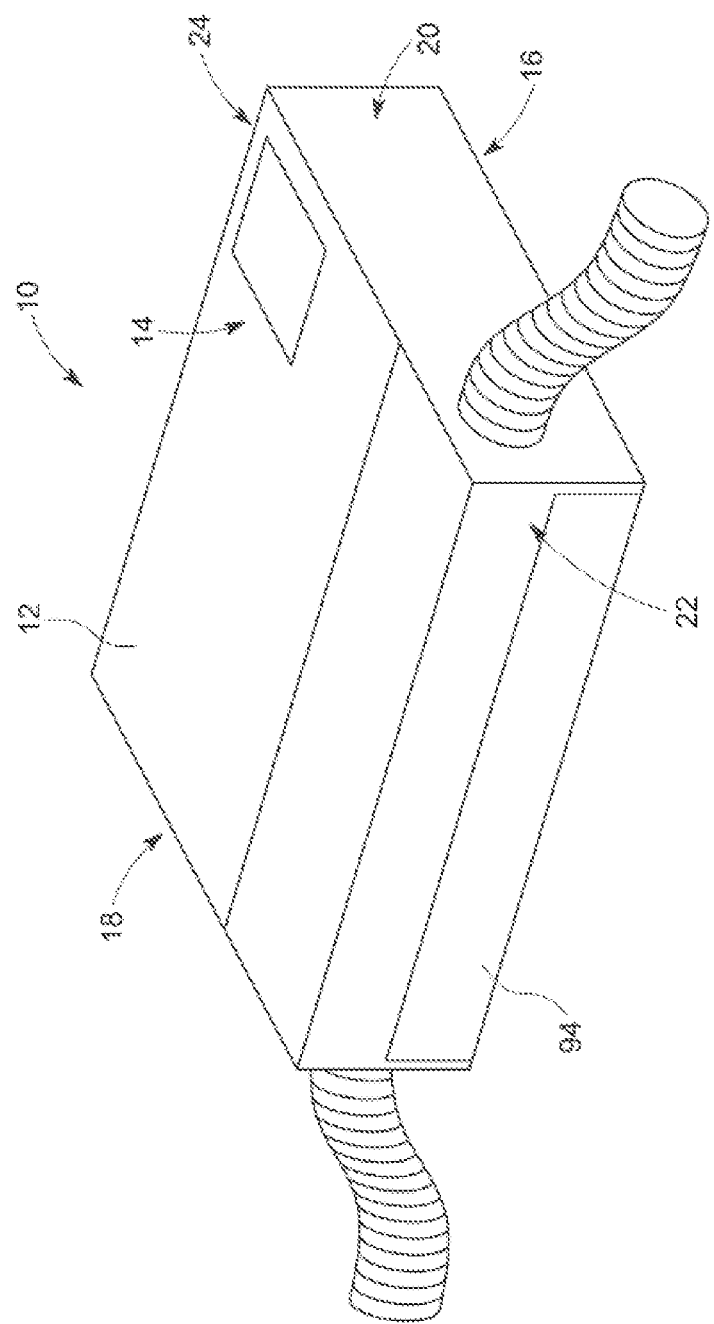
FIG. 1 is a perspective view of an apparatus for controlling pest animals according to a first embodiment of the present disclosure.

Referring to FIG. 1, an exemplary apparatus for controlling an animal pest according to a first embodiment is shown generally at 10. The apparatus 10 comprises a casing 12 having a path therethrough as will be more fully described below. The passage 30 includes an impacting member 54 positioned to move across the path towards so as to kill the rodent before dropping it into a container in the bottom of the apparatus.

As utilized herein, the term animal pest will be understood to mean any animal population which is desirous of being controlled. In particular, the term animal is not meant to be limiting but may be utilized to describe any animal, including without limitation, birds, rabbits, rodents, such as by way of non-limiting example, rats, mice, squirrels, marmots or any other animal species considered to be a pest.

Figure 2:
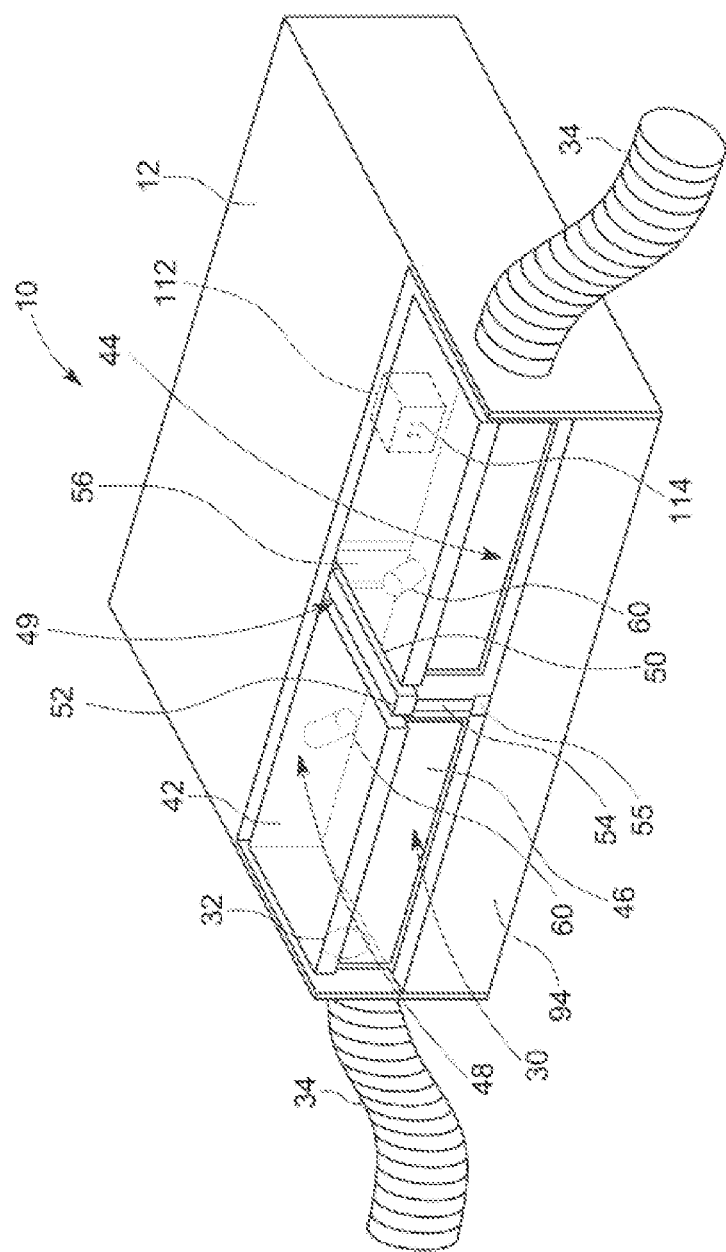
FIG. 2 is a perspective view of the apparatus of FIG. 1 with the top cover removed.

The casing 12 may be formed of any suitable shape and extend between top and bottom, 14 and 16, respectively, first and second sides, 18 and 20, respectively and front and rear, 22 and 24, respectively. The casing 12 may be made of any suitable material including by way of non-liming example, plastics, metal or composite materials. The casing 12 includes a passage, generally indicated at 30 in FIG. 2, comprising a passage extending between the first and second sides 18 and 20 proximate to the front 22. The path is substantially closed off from the remainder of the casing 12 so as to prevent a rodent which enters the passage 30 from entering the remaining areas of the casing 12. Each of the first and second sides 18 and 20 includes apertures or entrances 32 therethrough so as to permit access to a rodent into the passage 30. As illustrated in FIGS. 1 and 2, the apparatus 10 may further include ramps or tubes 34 so as to assist entrance of a rodent into the passage 30. The tubes 34 may be substantially flexible so as to permit the open end thereof to be located at any desired location around the apparatus thereby increasing flexibility in the location of the apparatus relative to the inlet location. Although the present description contemplates the apparatus being used to catch rats, it will be appreciated that it may also be utilized to catch other types of rodents, including, without limitation, mice, squirrels, as well as other pests including birds such as pigeons and the like.

As illustrated in FIG. 2, the passage 30 is formed through the top front of the casing 12 by top and bottom walls, 42 and 44, respectively and front and rear walls, 46 and 48, respectively. As illustrated in FIG. 2, the top and front walls 42 and 46 are transparent for illustrative purposes although they may be of any opacity level. In particular, it has been found that transparent top and front walls 42 and 46 may be advantageous for reducing stress of the target animal. Furthermore, one or more of the top or front walls 42 and 46 may be formed with openings therethrough so as the top and front walls 42 and 46 may also form the top 14 and front 22 of the casing 12 or may be separate from those portions forming the casing. The top and bottom walls and 44 and front and rear walls 46 and 48 form the passage 30 through the casing. The passage 30 is selected to have dimensions suitable for the desired rodent to pass through. By way of non-limiting example, for use as a rat trap, the passage 30 may have a width between 2 and 2.5 inches (51 and 64 mm) and a height between 2 and 2.5 inches (51 and 64 mm) for use with catching rats although it will be appreciated that other dimensions may be useful as well for use with catching different animals. The bottom wall 44 forms a walking surface on which the rodent walks and will therefore be formed to have sufficient strength to support the weight of the rodent. The bottom wall 44 may also be formed to have a surface that is relatively smooth to permit a dead rodent to be slid off of into a catchment container 92 as will be more fully described below.

Figure 3:
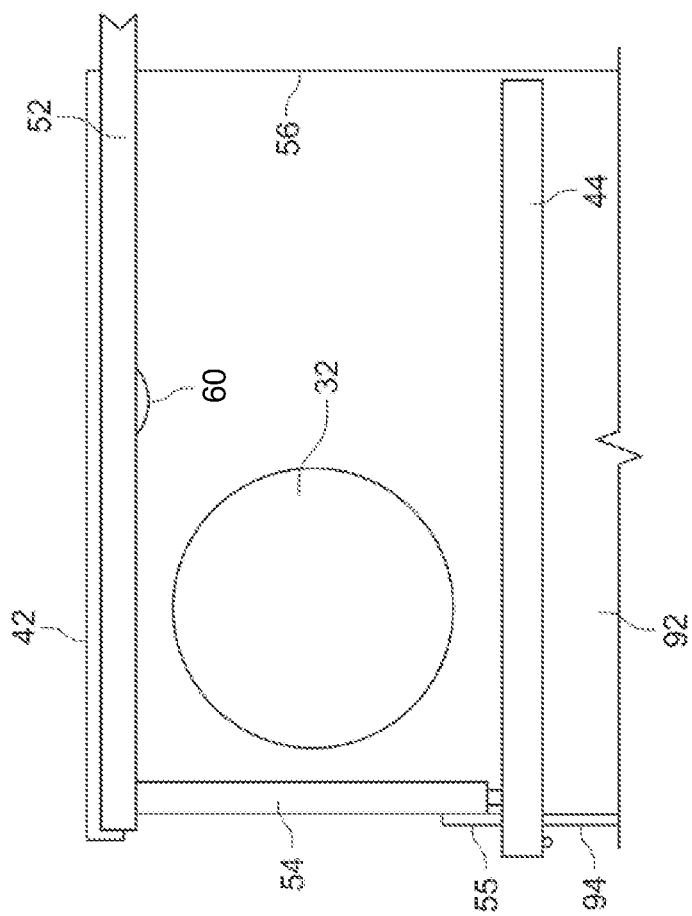
FIG. 3 is a cross sectional view of the apparatus of FIG. 1 as taken along the line 3-3 with the impactor at a first or ready position.
Figure 4:
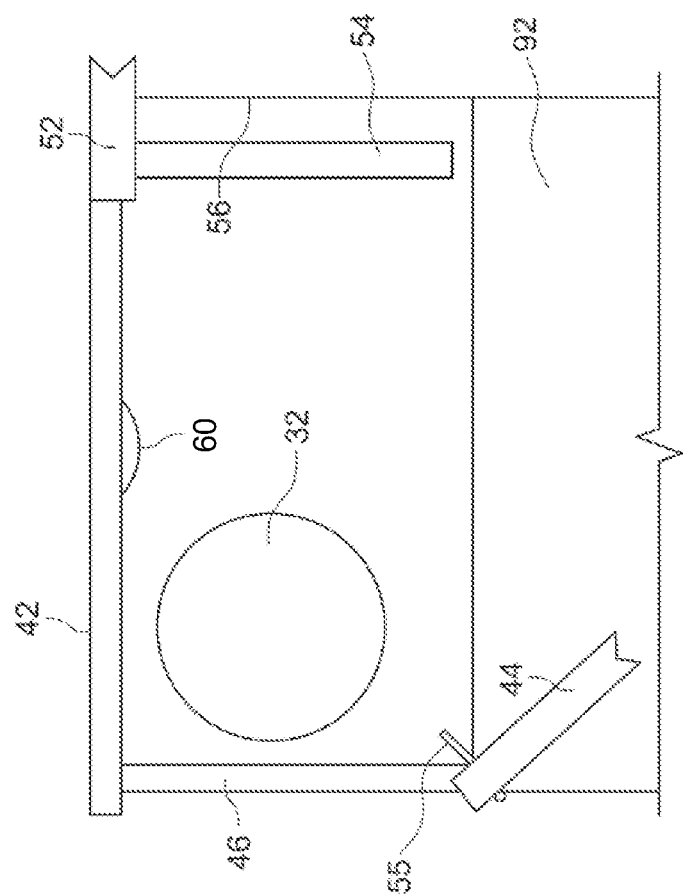
FIG. 4 is a cross sectional view of the apparatus of FIG. 1 as taken along the line 3-3 with the impactor at a second or striking position.

As illustrated, in FIG. 2, the top and front and rear walls 42, 46 and 48 are divided into portions extending from each of the first and second sides 18 and of the casing with a gap, generally indicated at 49 therebetween. A slidable arm 50 extends to a free distal end 52 through the gap from the rear wall 48 towards the front wall 46 along a path substantially planar to the top wall 42. An impactor 54 extends downwardly from the slidable arm such that as the slidable arm 50 is slidably displaced along its longitudinal path the impactor 54 moves from a position substantially planar to the front wall 46 as illustrated in FIG. 3 to a position proximate to the rear wall 48 as illustrated in FIG. 4. It will be appreciated that at the retracted position illustrated in FIG. 4, the impactor 54, will pinch or otherwise impact the neck of a rodent against the rear wall thereby breaking it and humanely killing the rodent.

The rear wall 48 may optionally include a strengthened or reinforced portion or anvil 56 adapted to resist movement as the rodent is forced thereinto by the movement of the impactor 54.

As illustrated in FIG. 2, the apparatus 10 includes a sensor 60 along the passage 30 to each side of the gap 49. The sensors 60 may be selected to be of any suitable type to indicate the presence of a rodent or other animal proximate thereto. In particular, the sensors may comprise infrared sensors so as to detect the body heat of the rodent.

Figure 11:
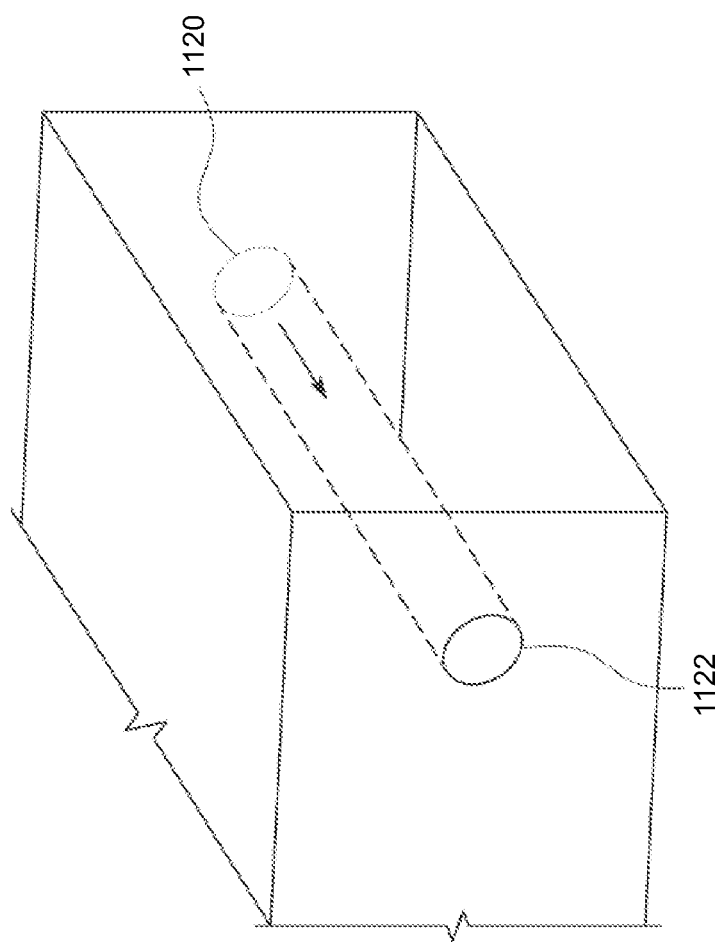
FIG. 11 is a perspective view of the passage of an apparatus for controlling pest animals according to a further embodiment of the present disclosure.

Optionally, as illustrated in FIG. 11, the sensor 60 may comprise a transmitter such as a light source 1120 on one side of the passage with a receiver, such as a light sensor 1122 on an opposite side wherein the presence of an animal between the light source and the receiver is operable to trigger operation of the impacting member. Optionally, the light source and receiver may be on the same side of the passage so as to detect a reflection of light off of the target animal. In operation, the controller 100 will be configured to activate the slidable arm 50 and impactor only when both sensors 60 are indicating the presence of a rodent thereunder. In such a manner, one sensor will indicate the presence of a rodent's body and the other will indicate the presence of the rodent's head such that the neck of the rodent is located between the impactor 54 and the anvil 56. It will also be appreciated that the sensors may also be used to indicate which direction the rodent entered the apparatus from by indicating which sensor 60 detected the rodent first. It will also be observed that having openings 32 in each end of the passage 30 with sensors 60 an equal distance from the slidable arm 50 will permit the apparatus to kill a rodent entering the apparatus from either direction. In practice it has been found that locating the sensors away from the slidable arm by a distance selected to be between 1 and 1.25 inches (25 and 32 mm) has been suitable for use in catching rats, although it will be appreciated that other distances may be useful as well for different animals.

Figure 8:
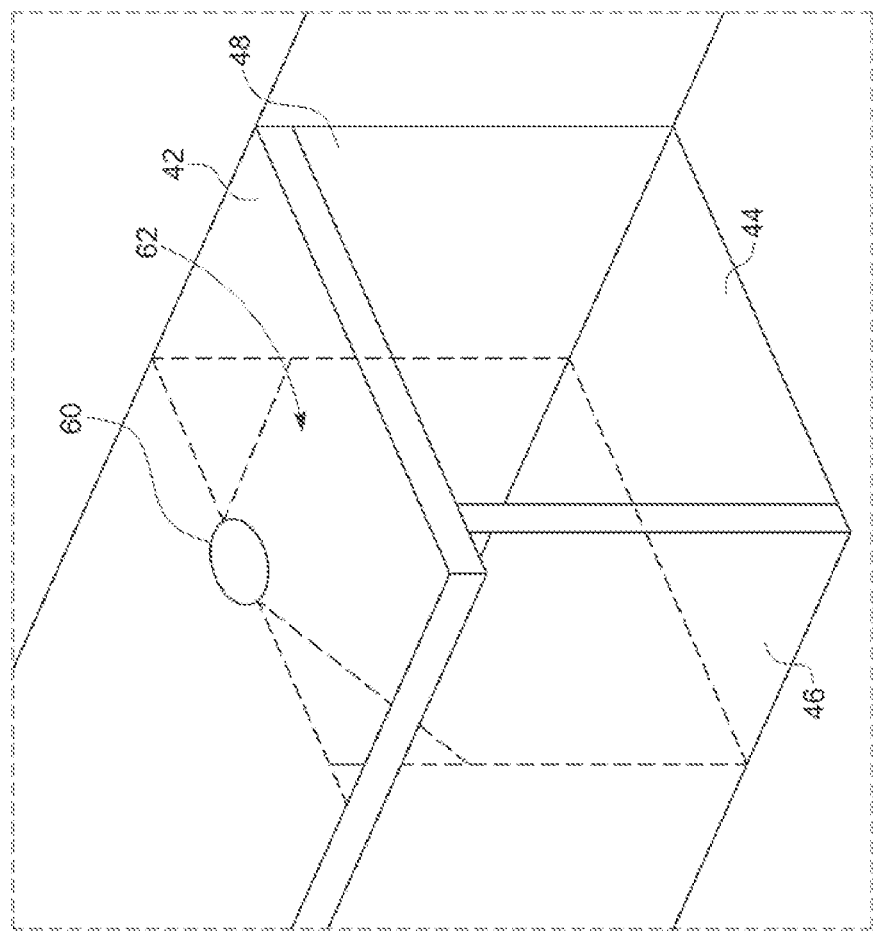
FIG. 8 is a partial perspective view of the path illustrating the sensing plane of the sensors.
Figure 9:
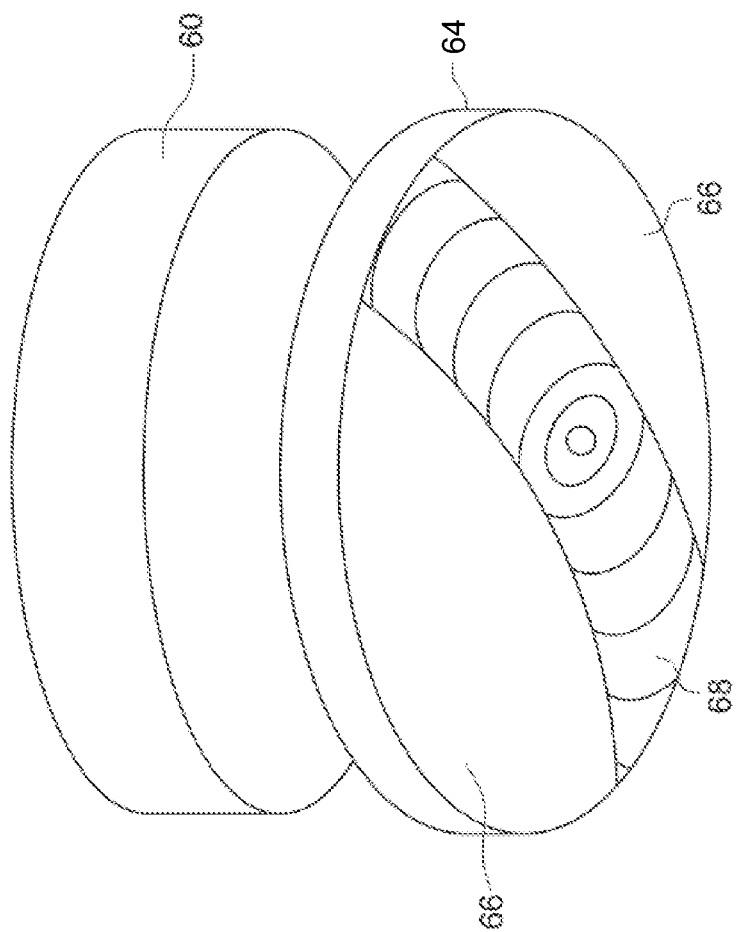
FIG. 9 is a bottom exploded view of a sensor according to a first embodiment of the present disclosure.

Although infrared sensors are described above it will be appreciated that the sensor 60 may also selected to be any other type including, motion, ultrasonic, laser or optical sensors. In particular, the sensors 60 may form an infrared curtain across the passage 30 as generally indicated as 62 in FIG. 8. In particular, according to one embodiment of the present invention with reference to FIG. 9, the sensors 60 may be selected to form the curtain 62 across the path by applying a lens 64 thereover. In particular the lens 64 may be selected to be a Fresnel lens as are commonly known. The lens may have two blacked out or otherwise side portions 66 with an open region 68 therebetween so as to restrict the sensing region to the curtain 62. It will be appreciated that a Fresnel lens is known to create a wide dispersal pattern such that the majority of the passage 30 will be covered by the curtain 62. Although the sensor 60 is illustrated in the top wall 42, it will be appreciated that it may also be located in other positions including the rear wall 48, bottom wall 44 or front wall 46.

Figure 5:
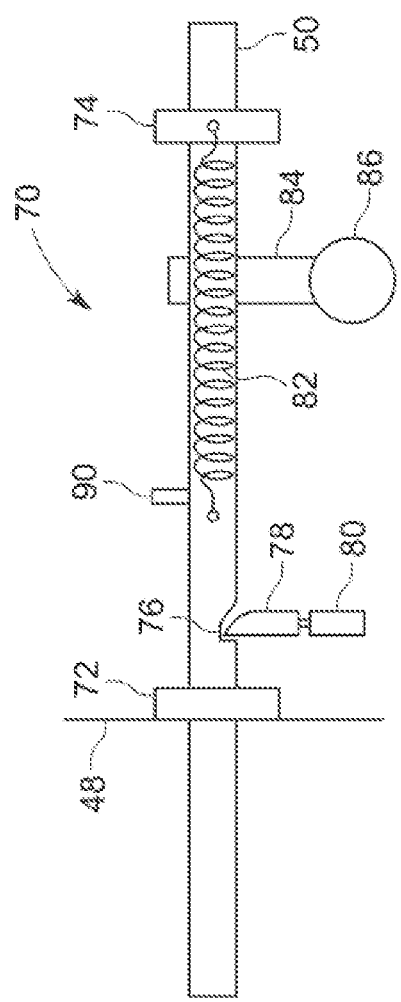
FIG. 5 is a top plan view of the slidable arm at a first or ready position.
Figure 6:
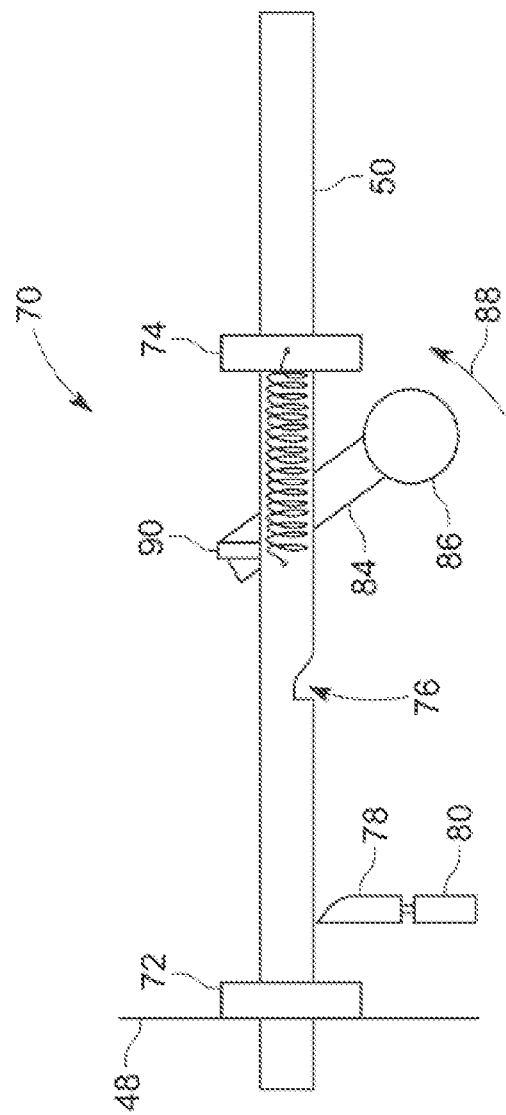
FIG. 6 is a top plan view of the slidable arm at a second or striking position.

Turning now to FIGS. 5 and 6, the retraction mechanism, 70 for the slidable rod 50 is illustrated. In particular the slidable rod 50 may be supported by one or more, and preferably at least two supports 72 and 74. The supports may include bushings or linear bearings so as to permit free slidable movement of the slidable rod 50. As illustrated in FIGS. 5 and 6, one of the supports 74 may be integrated into the rear wall 48 or anvil 56. The slidable rod 50 includes a notch 76 therein cooperating with a release pin 78. The release pin 78 may be retraced by a solenoid 80 so as to retracted upon receiving a signal from a control system as will be more fully described below. The slidable rod 50 includes a spring 82 extending from the slidable rod 50 to a support 74 or another fixed body in the apparatus. When the release pin 78 is retraced by the solenoid 80, the spring 82 rapidly retracts the slidable rod 50 so as to bring the impactor 54 towards the anvil 56 striking the neck of a rodent therebetween.

Once retracted, the control system 100 activates a motor 108 (not shown in FIGS. 5 and 6) connected to a reset arm 84. The reset arm 84 includes a wheel 86 or other bearing surface at a distal end thereof. The reset arm rotates in a direction generally indicated at 88 in FIG. 6 to contact an extension 90 or other portion of the slidable arm 50 so as to push it back to the initial position shown in FIG. 5 whereupon the release pin 78 is reengaged within the notch 76 preparing the slidable arm for another movement.

Figure 12:
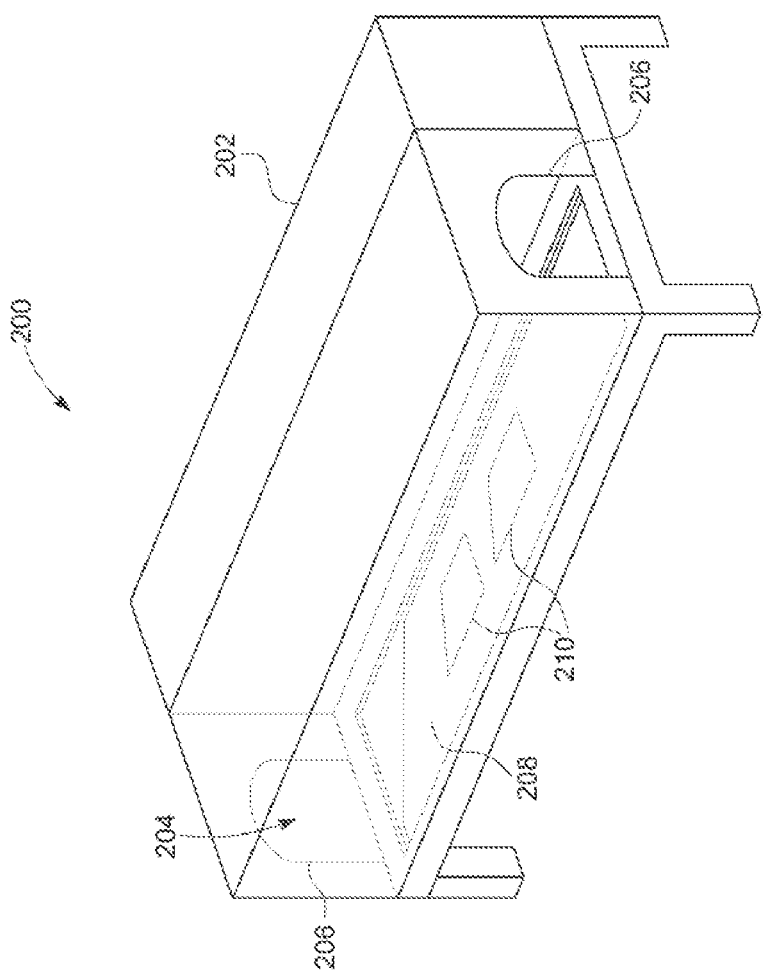
FIG. 12 is a cutaway perspective view of an apparatus for controlling pest animals according to a further embodiment of the present disclosure.

Turning back to FIGS. 2-4, the bottom wall 44 of the passage 30 may be hinged to the casing 12 such that it is operable to rotate downward when a rodent has been killed by the impactor 54. As illustrated, the bottom wall may include a tab 55 extending upwardly therefrom at a position wherein the impactor 54 does not permit rotation while the slidable rod 50 is retained in the initial position. When the slidable rod 50 is released by the release pin 78, the impactor 54 will be pulled back from the tab 55 thereby permitting the tab and bottom wall 44 to rotate downward as illustrated in FIG. 4. As the slidable rod 50 is moved back to the initial position, the impactor 54 will then push the tab 55 and therefore also the bottom wall 44 back to the initial position reforming the passage 30. A catchment area 92 may be located below the bottom wall 44 configured to catch and retain the bodies of the rodents for further study and disposal. The catchment area 92 may be formed into a drawer 94 for ease of removal. Optionally, the casing 12 may be provided with at least one let as illustrated in FIG. 12 so as to space the casing above a ground surface such that killed animals are deposited onto the ground under the casing thereby permitting other animals and scavengers to consume and/or remove the carcases.

Figure 10:
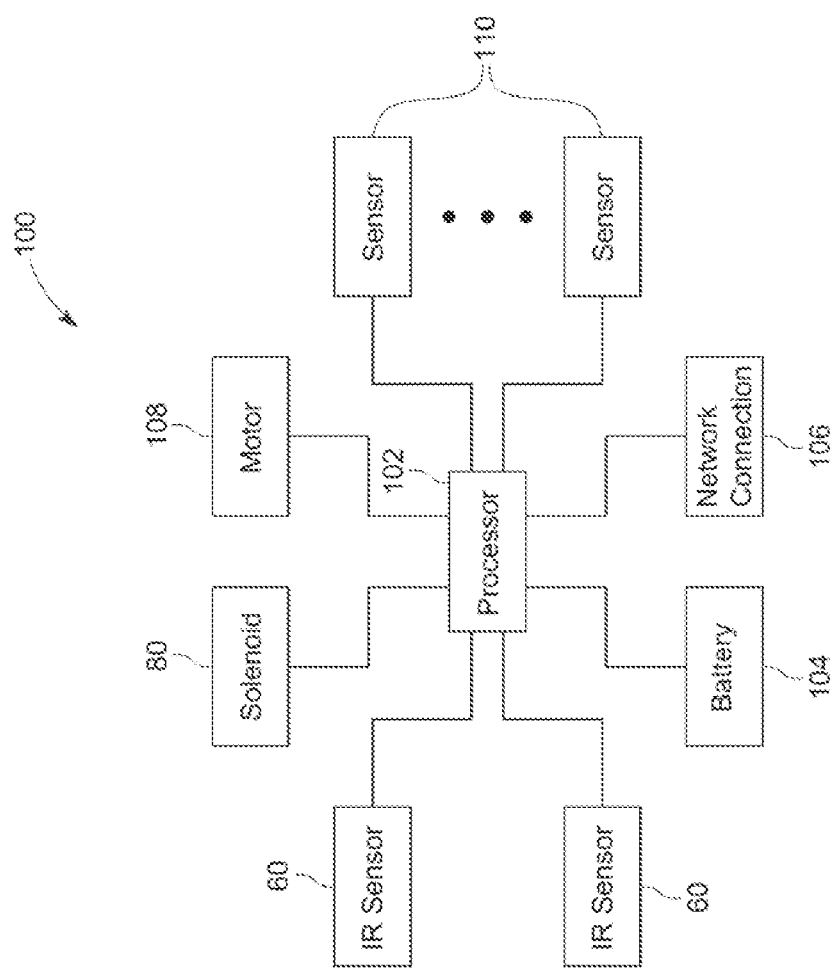
FIG. 10 is a block diagram of the control system of the apparatus of FIG. 1.

Turning now to FIG. 10, a controller 100 for operating the apparatus is illustrated. The controller 100 includes a processor adapted to control the operation of the various components and store and transmit information as may be recorded by the apparatus as set out below. More generally, in this specification, including the claims, the term "processor" is intended to broadly encompass any type of device or combination of devices capable of performing the functions described herein, including (without limitation) other types of microprocessors, microcontrollers, other integrated circuits, other types of circuits or combinations of circuits, logic gates or gate arrays, or programmable devices of any sort, for example, either alone or in combination with other such devices located at the same location or remotely from each other, for example. Additional types of processor will be apparent to those ordinarily skilled in the art upon review of this specification, and substitution of any such other types of processor circuits is considered not to depart from the scope of the present disclosure. In particular, the processor 102 is in communication with the sensors 60 and the solenoid 80 and motor 108 to control the operation thereof when both sensors 60 detect the presence of a rodent across their respective curtains 62. The control system may also include a battery 104 providing power to the various components and a network connection 106 such as a radio transmitter, Ethernet adapter or the like for providing communication for providing communication between the processor 102 and one or more remote computers or users. The control system 100 may include one or more additional sensors 110 adapted to sense and transmit to the processor 102 one or more conditions including, without limitation, time of day, temperature, humidity, barometric pressure or the like. It will be appreciated that this information may be recorded by the processor along with records of each rodent caught so as to provide additional detail for scientific and research purposes as to the effectiveness of placement, timing and other data concerning the operation of the apparatus.

Figure 7:
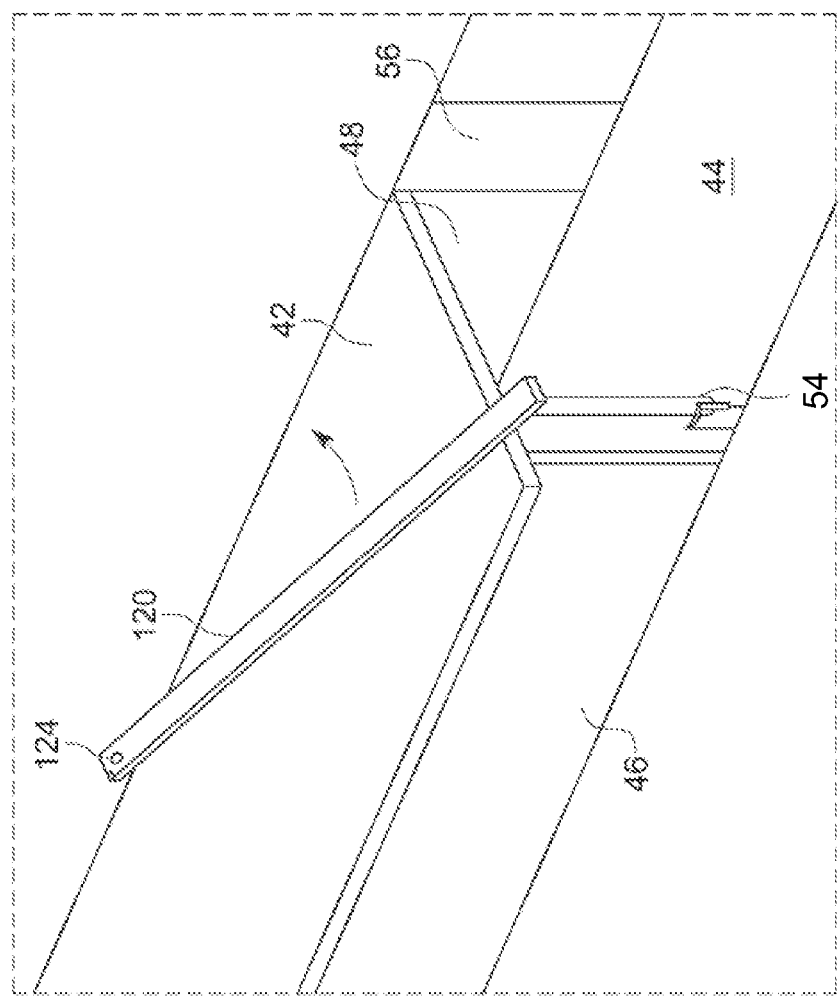
FIG. 7 is a top plan view of a rotating arm according to a further embodiment of the present disclosure.

Although a slidable arm 50 is described above, it will be appreciated that other movement types for the impactor may be utilized. As illustrated in FIG. 7 a rotary arm 120 may be utilized having a pivot point about an axis 124. The rotary arm 120 will include a spring such as a tension or rotary spring to pull the impactor 54 towards the anvil 56. Optionally, the impactor 54 may also be rapidly moved towards the anvil 56 by any other means including a solenoid or the like. In some embodiments, the impactor and/or the anvil may be shaped such as, by way of non-limiting example by the inclusion of a ridge or other suitable shape so as concentrate the force applied thereby or to align with each other so as to provide an increased spinal column separating force to the target animal. As illustrated in FIG. 2, the apparatus 10 may include a bait 112 located at any position within the apparatus so as to entice the rodents into the passage 30. In particular openings 114 from the bait into the passage 30 may be provided to attract the rodents into the path. Examples of suitable bait materials are well known in the art. The bait may be optionally be a solid bait type dispensed by an auger into the passage or may also be a liquid or gel type bait dispensed by a pump such as, by way of non-limiting example, a peristaltic pump. The apparatus 10 may further include more than one bait 112 module which may be selectively covered or uncovered by the processor 102 to vary or change between one or more different type of bait.

Although the passage 30 is illustrated as having a substantially uniform cross section, it will be appreciated that the path may be provided to have a greater width proximate to the first and second sides 18 and 20. Optionally, bristles or other flexible members may extend from one or more sides of the passage to provide an appearance of a smaller path without obstructing it to the passage of larger rodents for rodents that prefer smaller spaces.

Optionally, with reference to FIG. 12, according to a further embodiment, the pest animal control apparatus 200. The apparatus 200 comprises a casing 202 having at least one passage 204 formed therein. As illustrated, the passage 204 may extend from entrances 206 at each end of the passage 204 but may also extend only from one side. The passage 204 includes a rotatable floor 208 having at least one electric shock delivery pad 210 thereon. The electric shock delivery pads 210 may be connected to an electrical source, such as by way of non-limiting example an electrical outlet, battery or capacitor so as to be operable to deliver a killing electrical charge to the target animal. As illustrated in FIG. 12, the pads 210 may optionally be arranged in pairs such that the charge is delivered to the animal when both pads are stepped on and may be arranged longitudinally or transversely within the passage. The floor 208 may be configured to drop after the delivery of the fatal charge to the animal similar as set out above. As illustrated in FIG. 12, the casing 202 may be spaced above a ground surface with legs 212 or the like so as to permit the dead animals to be deposited below the casing 202 or may optionally include a container therein adapted to receive and store the dead animals.

While specific embodiments have been described and illustrated, such embodiments should be considered illustrative only and not as limiting the disclosure as construed in accordance with the accompanying claims.

What is claimed is:

1. An apparatus for controlling animal pests comprising:
   a housing having a passage extending into the housing from an entrance of the housing, the passage having a front wall and a rear wall;
   an impacting member movable across the passage from a first position adjacent to the front wall to a second position adjacent to the rear wall, the impacting member having a slidable arm extending out from the rear wall and having a free distal end having an impactor extending downwardly from the free distal end of the slidable arm at the front wall when the impacting member is in the first position;
   an anvil positioned on the rear wall with the impactor capable of impacting the anvil;
   a retraction mechanism having a first support and a second support with the first support being integral with the rear wall, and a spring connected to the second support and the slidable arm;
   a planar sensor spaced apart from the impacting member by a predetermined distance along the passage towards the entrance, the planar sensor configured to sense a presence of an animal pest across a sensing plane in the form of a curtain that is perpendicular across the passage at a predetermined distance from the impacting member; and
   the impacting member is operable to be released to rapidly move across the passage from the first position adjacent to the front wall toward the second position and the anvil when the planar sensor indicates the animal pest has passed through the sensing plane.

2. The apparatus of claim 1 wherein the planar sensor includes a lens there over comprising two blacked out side portions with an open region there between to restrict sensing of the animal pest.

3. The apparatus of claim 1 further comprising a controller operable to cause the impacting member to move across the passage, impacting the animal pest upon receipt of a signal from the planar sensor.

4. The apparatus of claim 1 further comprising a second planar sensor spaced on an opposite side of the impacting member along the passage from a side of the impacting member on which the planar sensor is located.

5. The apparatus of claim 4 wherein the impacting member is configured to impact the animal pest when both the planar sensor and the second planar sensor indicate the presence of the animal pest at the sensing plane thereof.

6. The apparatus of claim 5 wherein the planar sensor and the second planar sensor are spaced equal distances away from the impacting member.

7. The apparatus of claim 6 wherein the planar sensor and the second planar sensor are spaced away from the impacting member by the equal distances corresponding to a distance from a nose to a neck of a target animal pest.

8. The apparatus of claim 1 wherein the retraction mechanism further comprises a release pin connected to a solenoid.

9. The apparatus of claim 8 wherein the slidable arm further comprises a notch for receiving the release pin.

10. The apparatus of claim 9 further comprising a reset arm for moving the impacting member from the second position back to the first position.

11. The apparatus of claim 10 further comprising a reset motor connected to the reset arm.

12. The apparatus of claim 10 wherein the reset arm further comprises a wheel.

13. The apparatus of claim 1 wherein the retraction mechanism further comprises a release pin connected to a solenoid and the slidable arm further comprises a notch for receiving the release pin.

14. The apparatus of claim 1 wherein the passage includes substantially transparent walls.

15. The apparatus of claim 1 further comprising a bait dispenser operable to discharge a bait into the passage.

* * * * *